United States Patent Office 3,452,888
Patented July 1, 1969

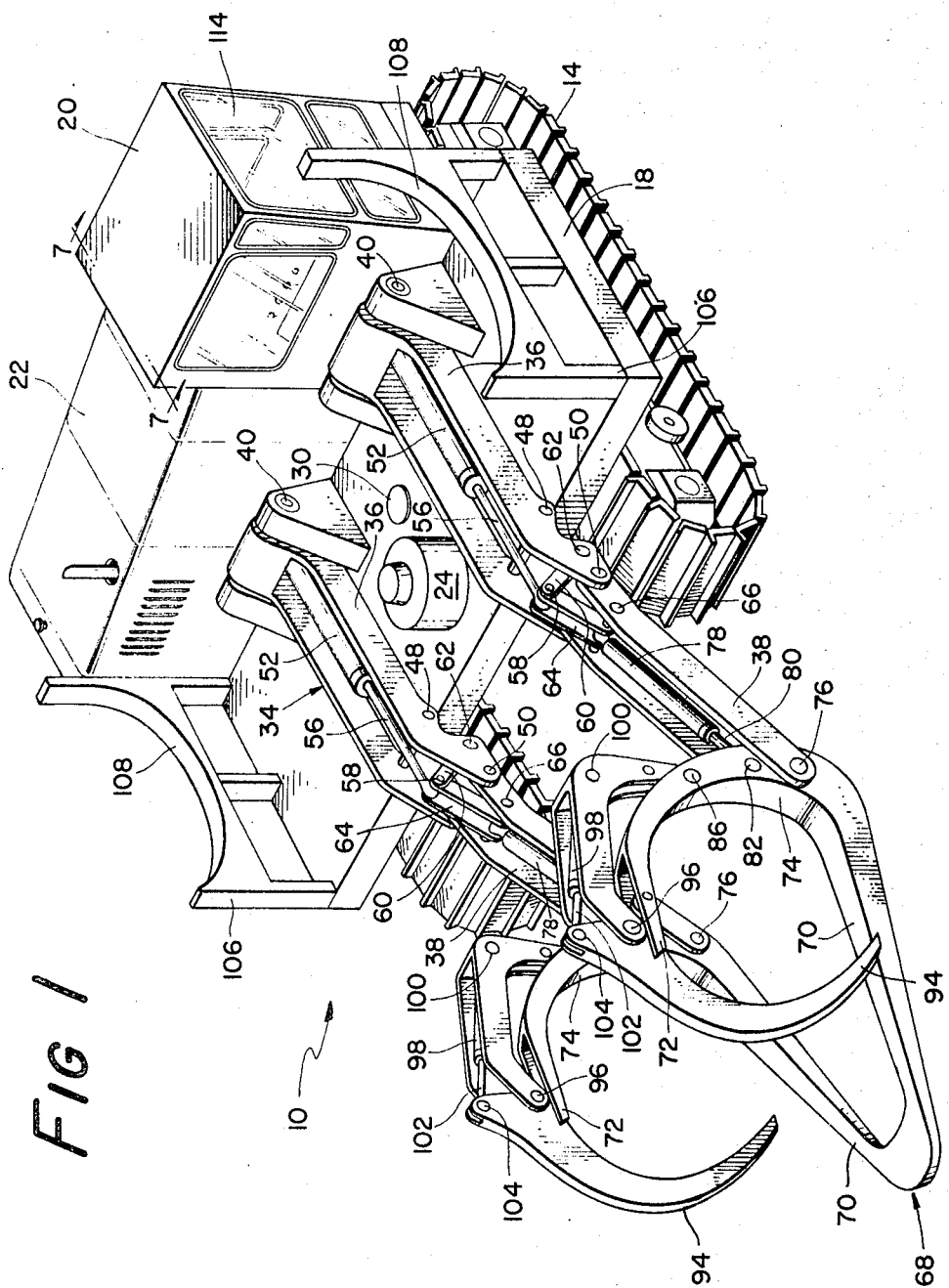

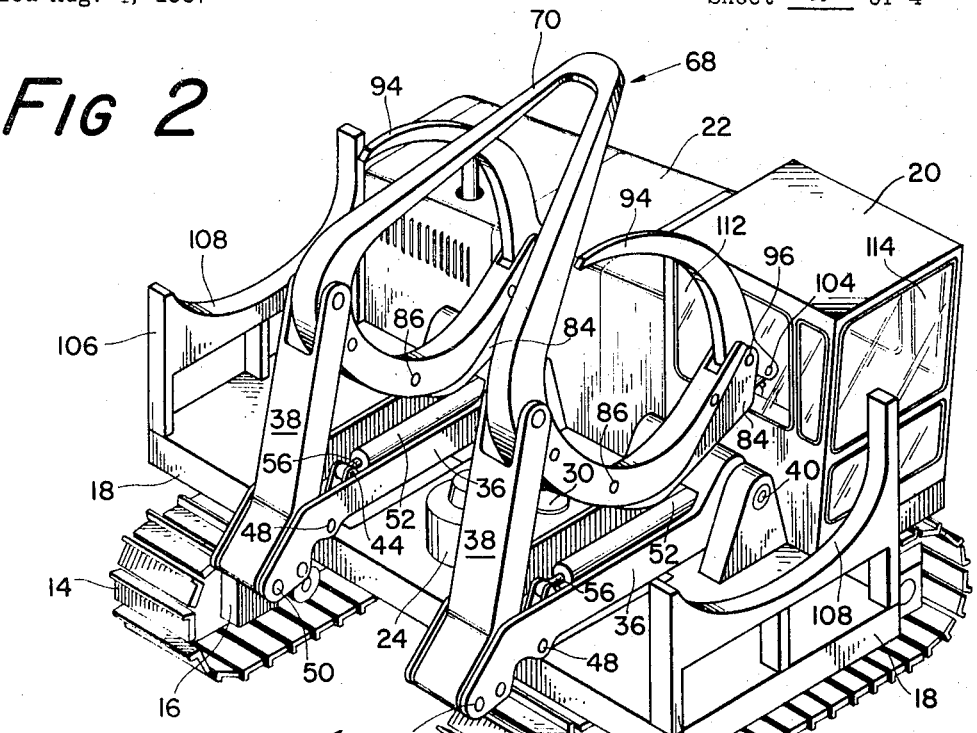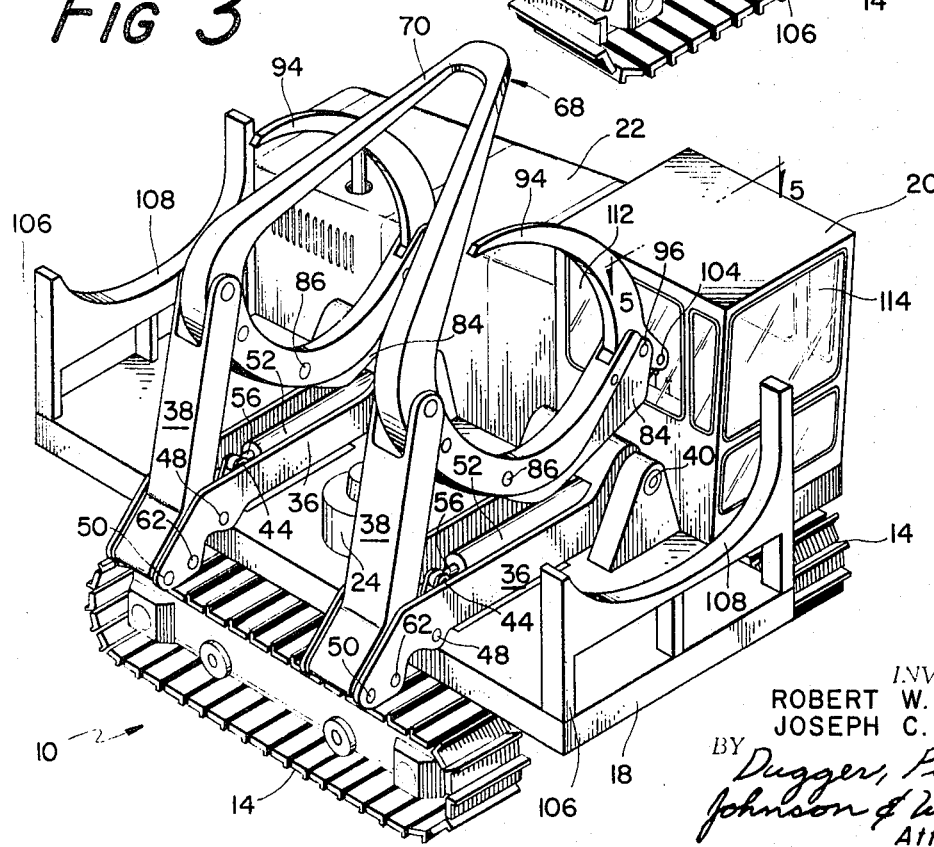

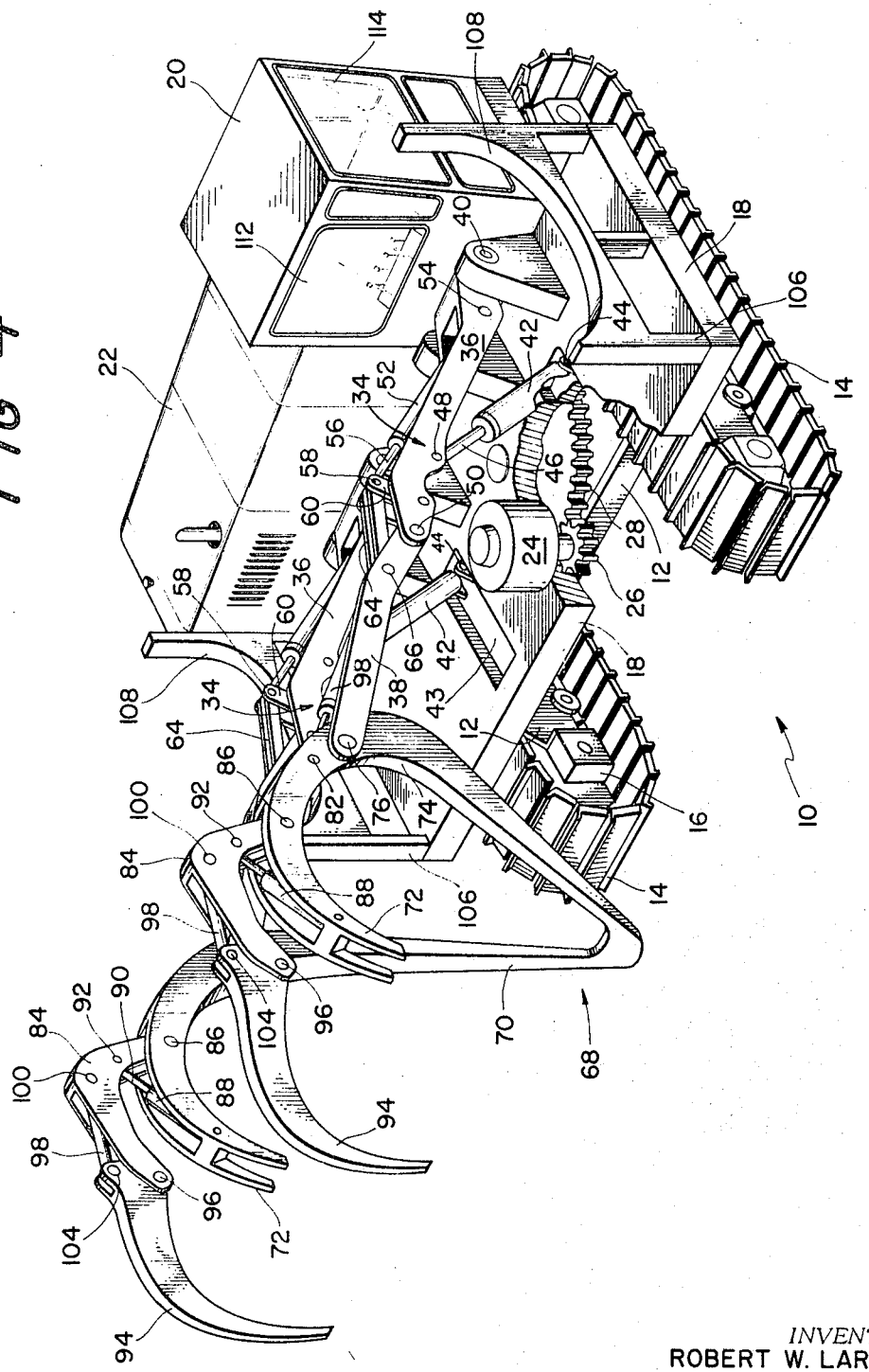

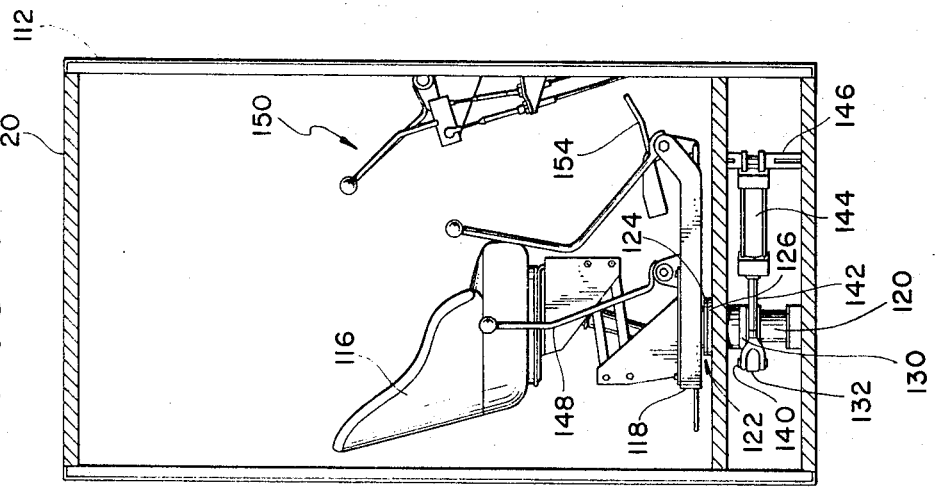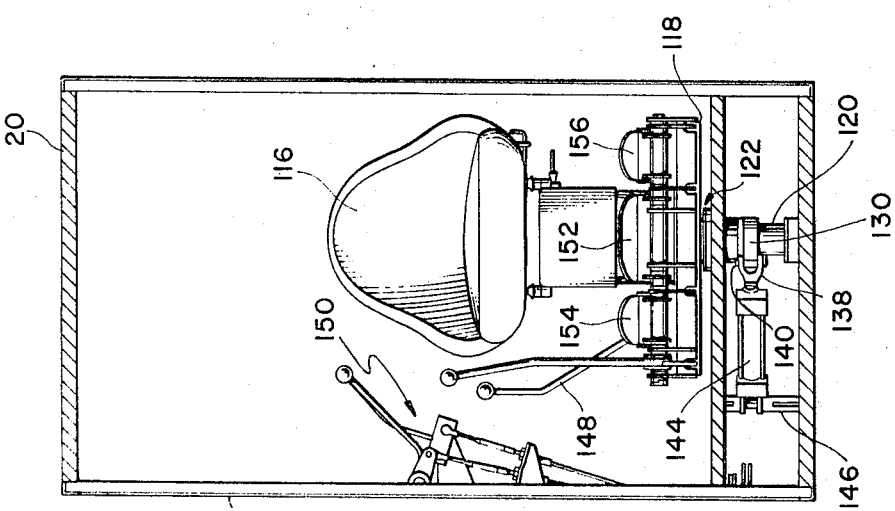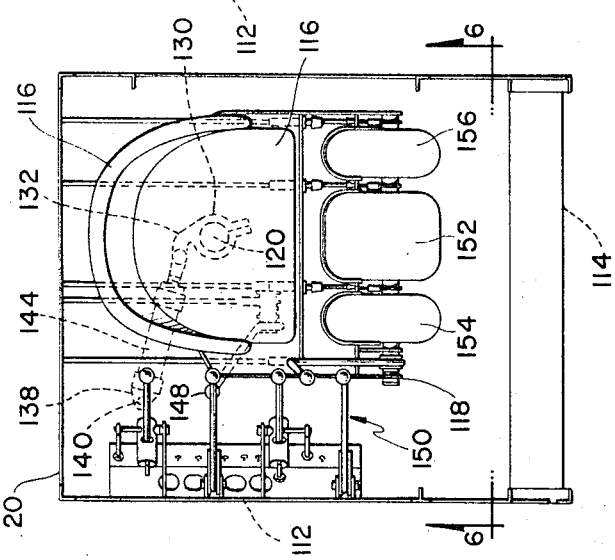

3,452,888
APPARATUS FOR LIFTING AND FORWARDING TREE-LENGTH LOGS
Robert W. Larson, Port Arthur, Ontario, Canada, and Joseph C. Jam, Gilbert, Minn., assignors to Beloit Corporation, Beloit, Wis., a corporation of Wisconsin
Filed Aug. 4, 1967, Ser. No. 658,372
Int. Cl. B60p *1/48, 3/00*
U.S. Cl. 214—80                                10 Claims

ABSTRACT OF THE DISCLOSURE

An articulated boom is mounted on a swing platform of a vehicle. When the platform is in one rotative position, the vehicle can approach a pile of tree-length logs laying on the ground and by means of a fork carried at the free end of the boom, the logs can be lifted into an overlying relation with the platform so they can be forwarded to a new location when the platform has been swung into a position parallel to the direction in which the vehicle moves. Within the cab on the swing platform is a seat that is rotatable about a vertical axis through 90° so that the respective lifting and forwarding operations can be respectively viewed and controlled.

Cross-reference to related application

Apparatus for loading tree-length logs onto a swingable platform that is tiltable into an unloading position is described and claimed in a co-pending application for "Apparatus for Loading and Transporting Tree-length Logs," Ser. No. 658,371, filed on even date herewith, in the names of Robert Y. Larson and John P. Lundberg, and assigned to the same assignee as this application.

Background of the invention

The present invention relates to apparatus that lifts a pile of tree-length logs and thereafter hauls the logs out of a wooded region. As described in United States Patent No. 3,252,487, issued on May 24, 1966, for "Apparatus for Delimbing and Felling Trees," trees of substantial height are delimbed while standing and then are felled. When it is recognized that such logs may have a length on the order of from 75 to 85 feet, a problem arises with respect to the handling of the logs. It is customary to employ a grapple for lifting the logs onto a truck or trailer in order that they can be moved out of the wooded region. However, this necessitates a considerable amount of equipment and also requires an additional operator for the grappling equipment.

A feature of the present invention is that a single vehicle can be utilized for lifting the logs and also forwarding the logs to a particular location, such as where a slasher is located or where the logs are to be reloaded for further transportation.

Summary of the invention

Briefly, a vehicle, such as a tractor with endless tracks, has mounted thereon a platform that can be swung through 360° about a substantially vertical axis. The logs are elevated by means of a boom and fork carried at the free end of the boom when the platform is in a first or transverse position. After the tree-length logs have been elevated and moved to a superimposed position with respect to the platform, the platform is swung into a second or longitudinal position with respect to the direction the vehicle is designed to travel. Thus, by reason of the fork carried at the free end of the boom, a pile of several logs can be elevated and then held in their elevated position during rotation of the platform through a 90° angle which it rotates through in order to reach its second or longitudinal position and are continued to be so held to allow their transportation to another location for further processing. The platform, after being swung back to its first or transverse position, is then oriented so that the boom can be swung outwardly and the fork at its free end tilted so as to discharge the logs onto the ground at the desired destination.

Through the agency of a rotatable seat, the operator can easily turn himself so as to face one window that allows viewing of the lifting operation and also to manipulate the controls employed during the lifting operation which are situated adjacent this particular window. When the seat is rotated through 90° so that the operator faces the forwardly directed window, then he can steer the vehicle while forwarding the logs to a vantage point where they are to be discharged.

Brief description of the drawings

FIGURE 1 is a perspective view illustrating our apparatus as it starts to lift several tree-length logs (not shown in order to allow the apparatus to be depicted on a larger scale);

FIGURE 2 is a perspective view showing the apparatus after the logs (if shown) would have been lifted and shifted to an overlying position with respect to the swing platform;

FIGURE 3 is another perspective view illustrating the platform after it has been rotated from the position illustrated in FIGURE 2 into a position parallel to the direction in which the vehicle moves, this being the manner in which the logs would be held during forwarding thereof;

FIGURE 4 is a perspective view of our apparatus in a position in which the logs would be discharged after they have reached their destination, a portion of the platform being broken away to show the drive pinion and swing gear;

FIGURE 5 is a top plan view of the interior of the cab, the view being taken in the direction of line 5—5 of FIGURE 3 in order to depict the seat in the position it assumes when forwarding logs;

FIGURE 6 is a front elevational view of the seat appearing in FIGURE 5, the view being taken generally in the direction of line 6—6 of FIGURE 5, and FIGURE 7 is an elevational view corresponding generally to FIGURE 6 but depicting the seat after it has been rotated through 90° so as to allow the operator to view the lifting operation and to manipulate the controls associated with such operation, the view being in the direction of line 7—7 of FIGURE 1.

Description of the preferred embodiment

Referring now in detail to FIGURES 1–4 of the drawings, the apparatus exemplifying the present invention comprises a vehicle 10 having a frame or chassis 12 (visible at two locations in FIGURE 4). A pair of endless tracks 14 renders the apparatus mobile, hydraulic motor 16 (FIGURES 2 and 4) actuating the tracks so as to propel or advance the vehicle 10. A platform 18 has a swinghouse or cab 20 thereon, and more will be said hereinafter concerning the interior of said cab. The platform 18 is intended to be swung through at least 90°, usually a full circle which is accomplished by a hydraulic motor 24 driving a pinion 26 (a portion of the platform 18 being broken away in FIGURE 4) on the underside of the platform in mesh with a large swing gear 28 fixedly mounted on the chassis or frame 12. Schematically depicted is a bearing or pin 30 providing the vertical axis about which the platform 18 swings.

A pair of identical booms 34 are employed in practicing our invention, each of said booms 34 including a first or main boom section 36 and a second or end boom section 38. The sections 36 are pivotally mounted at 40 on the platform 18. Each of the sections 36 has a hydraulic cylinder 42, the closed end of which is pivotally supported at 44 (best seen in FIGURE 4) in a recess 43 formed in the platform 18. Each cylinder 42 has a piston rod 46 and the exposed end of the piston rod 46 in each instance is pivotally attached to its boom section 36 by a pivot pin 48. The cylinders 42, as well as additional cylinders hereinafter referred to, receive hydraulic fluid under pressure from the engine-pump combination 22. For the sake of simplicity, the flexible tubes supplying the hydraulic fluid to the various cylinders have been omitted.

As already stated, each boom 34 is composed of two sections 36 and 38. The second or end section 38 is pivotally connected to the section 36 by a pivot pin 50. A hydraulic cylinder 52 has its closed end pivotally connected at 54 to the first section 36. A piston rod 56 is contained in each cylinder 52 and its projecting end carries a pin 58 which is in turn connected to one end of a pair of parallel links 60. The other end of these links 60 is pivotally connected to the boom section 36 by means of a pin 62. A second pair of parallel links 64 is also connected to the pin 58 at one end and to a pin 66 at their other end, the pin 66 also being connected to the second boom section 36. In this way, the cylinders 52 serve to raise and lower the boom sections 38 with respect to the boom sections 36, whereas the cylinders 42 serve a similar purpose with respect to raising and lowering the first sections 36.

At this time, attention is directed to a curved fork 68 comprised of diverging straight leg portions 70 which are relatively long, relatively short straight leg portions 72, and a curved bight portion 74 integrally connecting the respective leg portions 70, 72 together. The curved fork 68 is tiltably carried at the free end of the booms 34, being pivotal on a pin 76 at the free end of the section 38 in each instance. In order to tilt or rock the curved fork 68, a cylinder 78 is utilized having its closed end connected to the previously-mentioned pin 66. Each cylinder 78 has slidably received therein a piston rod 80, the extending end of each rod being connected to a pin 82 which is attached to the fork 68 adjacent its bight portion 74.

A pair of angle arms 84 is pivotally carried by the curved fork 68 by pivot pins 86. A cylinder 88 for each arm 84 is utilized, its piston rod 90 carrying a pin 92 which is pivotally attached to its particular arm 84.

A pair of clamping jaws 94 each has a pin 96 via which these jaws 94 are pivotally mounted on the arms 84. A cylinder 98 for each jaw 94 has a pin 100 connecting its closed end to the leg portion 72 of the curved fork 68. The piston rod 102 of each cylinder 98 has a pin 104 for connecting the piston rod 102 to the particular jaw 94 that this piston rod is to actuate.

Although the need therefor will not be presently apparent, nonetheless it can be pointed out that a bunk member 106 is fixedly mounted at each end of the platform 18, having an upwardly facing curved surface or edge 108 in each instance.

Before proceeding further, it will be well to present an operational description of the parts described up to this point. Assuming that several logs are to be lifted, then the vehicle 10 is moved into the position pictured in FIGURE 1 so that the leg portions 70 of the curved fork 68 are pushed under the logs to be lifted which are not illustrated, although they have been pictured in said co-pending application. Stated somewhat differently, the tractive effort developed by the advancement of the vehicle 10 toward the logs when on the ground will be instrumental in crowding the fork 68 under the pile for lifting. Actually, a partial number of logs contained in a pile of almost any number can be handled. It will be appreciated that the swing platform 18 is at this time in a transverse position, being actuatable into such position by the hydraulic motor 24.

With the fork 68 under the logs, the logs, which are of tree-length size, are forced onto the fork member. Having done this with the jaws 94 raised, then the clamping jaws 94 are actuated by the cylinders 98 so as to clamp against the logs, assuming the position shown in FIGURE 1.

With the logs clamped in the fork 68, the boom sections 38 can be rotated upwardly from the position depicted in FIGURE 1 into the upstanding position shown in FIGURE 2. It will be appreciated that the rotation of the boom sections 38 is achieved via the cylinders 52. It is to be noted that during this lifting action, the weight of the logs is changed from the leg portions 70 into the bight portions 74 and to some extent onto the straight portions 72. If need be, the attitude of the fork 68 can be modified, this being done by introducing fluid under pressure into the cylinders 78 to change the angulation of the fork 68. Sufficient rotation of the fork 68 in the clockwise direction as viewed in FIGURE 2 will lower the logs sufficiently so that the bunks 106 will assist in holding or supporting the logs from this point on.

Having reached the stage illustrated in FIGURE 2, the operator then swings the platform 18 about the schematically presented pin 30 into its longitudinal position which is parallel to the direction in which the vehicle 10 normally moves. This second position makes it much more convenient for forwarding the tree-length logs to another location, for the vehicle 10 can now negotiate relatively narrow passes through wooded regions. The second position is illustrated in FIGURE 3. If the position of FIGURE 3 is not realized, then, owing to the substantial length of the logs, the vehicle cannot move readily through wooded areas. Hence, decided advantages are obtained, both with respect to the clearance of still standing trees in wooded regions and also as far as the stability of the vehicle is concerned, because the vehicle will usually be longer than it is wide, the latter being important because of the over-all length of these logs, ranging up to 85 feet as hereinbefore indicated.

In some instances, the logs are to be transported to a slasher where they will be cut into 6 to 8 foot sticks, and in other situations, they will be merely hauled to a central location and either stored there or reloaded for further movement. At any rate, it will be clear that a substantial gain is obtained by using the same vehicle for lifting and forwarding the logs. When the discharge location is reached, then the platform 18 is swung back through 90° so as to have the platform reside in the same transverse position that it originally was in during the lifting of the logs. The return to this position is shown in FIGURE 4 and it will be seen from this figure that the boom sections 36 and 38 are in a generally straight line relationship. They have been shown this way to pictorially demonstrate that the logs can be discharged onto a pile that has been built up to a substantial height. It is not believed necessary to show such a pile. The elevated condition of the fork 68 is brought about by utilizing the cylinders 42 so as to rotate the boom sections 36 upwardly from the horizontal positions in which they have appeared up to this stage. Also, the boom sections 38 can be rotated relative to the sections 36 via the cylinders 52. Still further, as is evident, the fork 68 can be tilted to whatever degree is necessary to effect the gravitational discharge of the logs by means of the cylinders 78. The arms 84 can be angularly shifted by way of their cylinders 88 and the jaws 94 themselves can be actuated in a reverse direction from their clamping direction by the cylinders 98.

It will be observed that the cab 20 is provided with a first window 112 facing in the direction of the boom 34 so that the lifting operation can be readily viewed. A second window 114 faces in a direction at right angles to the window 112, being utilized when the logs are being forwarded. Consequently, the window 112 will be employed for viewing purposes in FIGURES 1, 2 and 4, whereas the window 114 will be employed in FIGURE 3.

Having presented the foregoing information, the importance of a feature now to be described will be appreciated. In this regard, attention is called to a seat 116 which appears in FIGURES 5, 6 and 7. The seat is fixedly mounted on a base 118 that swivels or rotates about a vertical axis furnished by a shaft 120. A thrust bearing 122 formed of an upper rotatable race 124 and a fixed lower race 126 functions to allow the above-referred-to rotation.

A clamp 130 affixed to the shaft 120 has an arm 132 extending therefrom. A clevis 138 has a pin 140 carried thereby which extends through the free end of the arm 132. The clevis 138 is attached to the projecting end of a piston rod 142 which is slidably carried by a cylinder 144. The closed end of the cylinder 144 is pivotally connected to an upright post or column 140. To cause fluid under pressure to enter the cylinder 144 for the purpose of swinging or rotating the seat 116 is a seat control lever 148.

It is not deemed important to designate the control levers collectively labeled 150 with respect to the specific role played by each, for the levers can be rearranged to suit the particular operating conditions. However, the control levers 150 which are disposed adjacent the first window 112 are readily accessible when the seat 116 is turned in this particular direction. Consequently, the manipulation of the control levers 150 will direct fluid under pressure into the appropriate cylinders 42, 52, 78, 88 and 98. The movement derived from these cylinders is believed obvious from the hereinbefore-presented description. All of the cylinders enumerated at this time, though, contribute to the lifting of the logs from the position on the ground to the position in which they are held for forwarding.

While the control levers 150 contribute to the lifting of the logs, a swing pedal 152 introduces into the motor 24 fluid under pressure so as to swing the platform 18 from the first position in which it appears in FIGURES 1 and 2 into the position illustrated in FIGURE 3. Also used when forwarding the logs to a new location are right and left track pedals 154 and 156, these pedals being employed when turning or steering the vehicle 10. The point to be made manifest at the moment, however, is that when the seat 116 has been swung from the position shown in FIGURES 5 and 6 to that pictured in FIGURE 7, the operator is then facing the window 114 and can readily drive the vehicle 10 to the new location where the logs are to be discharged, as shown in FIGURE 4.

Thus, the operator can actuate the control lever 148 so as to orient himself properly for the particular phase of the operation to be carried out. If the logs are to be lifted, then he moves the seat 116 so as to face the window 112, and when the logs are to be forwarded to a new location, he rotates the seat so as to face the window 114.

We claim:

1. Apparatus for lifting and forwarding tree-length logs comprising a self-propelled vehicle, an elongated platform having a length greater than the width of said vehicle and mounted for horizontal swinging movement about a generally vertical axis providing a substantially centrally disposed pivot point on said vehicle between a first position with its length generally transverse to the direction in which said vehicle travels and a second position generally parallel to the direction in which said vehicle travels, a pair of booms, means pivotally supporting said booms about a horizontal axis on said platform at spaced locations intermediate the ends of said platform so as to extend from one side of said platform in the direction said vehicle travels when said platform is in its said first position, and fork means attached to the free ends of said booms for engaging a pile of logs on the ground when said booms are lowered and movable without interference to a position above said platform and generally over said pivot point for holding said logs above said platform when said fork means is raised by said booms, and support means located on said platform adjacent the ends thereof for assisting said fork means in holding said logs, whereby swinging movement of said platform from its first position to its second position will allow said vehicle to forward said logs to a new location.

2. Apparatus in accordance with claim 1 in which said fork means is pivotally attached to the free ends of said booms.

3. Apparatus in accordance with claim 2 including jaw means pivotally carried on said fork means for clamping said logs in said fork means.

4. Apparatus in accordance with claim 3 in which each of said booms includes first and second sections, the first sections being pivoted at one end thereof to the side of said platform opposite said one side, said second boom sections being pivoted at one end to the other ends of said first sections, and said fork means being pivoted to the other ends of said second sections, whereby said first sections can be included upwardly and said fork means can be inclined downwardly to facilitate the unloading of the tree-length logs from said curved fork means.

5. Apparatus in accordance with claim 4 in which said first sections rest on said platform when in their lowermost positions to thereby facilitate the engaging of a pile of logs on the ground.

6. Apparatus in accordance with claim 5 including a first hydraulic cylinder for each of said second sections for actuating said second sections into various angular positions including an upstanding position which locates said fork means and the logs held thereby over said platform and above said pivot point.

7. Apparatus in accordance with claim 6 including a second hydraulic cylinder for each of said first sections for actuating said first sections into various angular positions so as to elevate appreciably said fork means when said first cylinders have effected a straight relation between said first and second sections, a third hydraulic cylinder for each of said second sections for tilting said fork means into a downwardly sloping position, said jaw means including a pair of pivotal jaw members for clamping said jaws, and a fourth hydraulic cylinder for each jaw member for actuating said jaw members into open positions so that the logs held in said fork means will be gravitationally discharged.

8. Apparatus in accordance with claim 1 including a cab on said platform having a first window facing said boom means and a second window facing in a direction at right angles to said first window, and a seat in said cab rotatable about a generally vertical axis through 90° so that the operator may face either said first or second window.

9. Apparatus in accordance with claim 7 including a cab on said platform having a first window facing said booms and a second window facing in a direction at right angles to said first window, a seat in said cab rotatable about a generally vertical axis through 90° so that the operator may face either said first or second window, power means for rotating said seat, and respective controls for said first, second, third and fourth pairs of cylinders disposed adjacent said first window so that the manipulation thereof is facilitated when said seat is rotated so that the operator faces said first window.

10. Apparatus in accordance with claim 1 including a cab on said platform disposed adjacent said opposite side thereof so as to prevent interference with said logs when above said pivot point.

References Cited

UNITED STATES PATENTS

| | | |
|---|---|---|
| 1,525,451 | 2/1925 | Kurtz. |
| 2,784,850 | 3/1957 | Batson et al. |
| 3,033,397 | 5/1962 | Busch. |
| 3,125,234 | 3/1964 | Gustine. |
| 3,165,217 | 1/1965 | Harris et al. 214—670 |
| 3,221,908 | 12/1965 | Larson 214—147 |
| 3,227,295 | 1/1966 | Hamilton et al. 214—77 |
| 3,281,119 | 10/1966 | Westfall 214—147 X |
| 3,288,313 | 11/1966 | Hamilton 214—147 |

FOREIGN PATENTS

| | | |
|---|---|---|
| 659,445 | 3/1963 | Canada. |
| 689,502 | 6/1964 | Canada. |
| 1,885,412 | 2/1964 | Germany. |

GERALD M. FORLENZA, *Primary Examiner.*

R. J. SPAR, *Assistant Examiner.*

U.S. Cl. X.R.

214—132, 147